(12) United States Patent
Krasuski

(10) Patent No.: US 8,099,256 B2
(45) Date of Patent: Jan. 17, 2012

(54) METHOD OF DETERMINING THE DIMENSIONS OF A MAILPIECE

(75) Inventor: Marek Krasuski, Fontenay Aux Roses (FR)

(73) Assignee: Neopost Technologies, Bagneux (FR)

(*) Notice: Subject to any disclaimer, the term of this patent is extended or adjusted under 35 U.S.C. 154(b) by 530 days.

(21) Appl. No.: 12/331,157

(22) Filed: Dec. 9, 2008

(65) Prior Publication Data

US 2009/0150117 A1 Jun. 11, 2009

(30) Foreign Application Priority Data

Dec. 10, 2007 (FR) ...................................... 07 59669

(51) Int. Cl.
*G01B 21/02* (2006.01)

(52) U.S. Cl. ........ 702/163; 702/155; 702/158; 702/170; 705/400; 705/401; 705/402; 705/403; 705/407; 705/414; 705/416; 177/25.11; 177/25.12; 177/26

(58) Field of Classification Search .................. 702/155, 702/158, 163, 170; 705/400–403, 407, 414, 705/416; 177/25.11, 25.12, 26
See application file for complete search history.

(56) References Cited

U.S. PATENT DOCUMENTS

| 4,383,301 A | 5/1983 | Morita |
| 4,963,433 A | 10/1990 | Ogawa |
| 5,755,918 A | 5/1998 | Cetnar |
| 2008/0262978 A1* | 10/2008 | Collings et al. ............... 705/401 |

FOREIGN PATENT DOCUMENTS

| EP | 1560165 A1 | 8/2005 |
| EP | 1811266 A1 | 7/2007 |
| GB | 2074321 A | 10/1981 |

* cited by examiner

*Primary Examiner* — Sujoy Kundu

(74) *Attorney, Agent, or Firm* — Sughrue Mion, PLLC

(57) ABSTRACT

A method of determining the dimensions of a mailpiece by means of a portable measuring device having a housing provided with an opening having a side reference surface along which the mailpiece is guided under a position sensor in a first pass along a first dimension of the mailpiece, after which pass a value for the first dimension of the mailpiece is determined by a processing unit and is communicated to a franking system to which the portable measuring device is connected, and in a second pass along a second dimension of the mailpiece, after which pass a value for the second dimension of the mailpiece is determined by the processing unit and is communicated to the franking system.

13 Claims, 3 Drawing Sheets

METHOD OF DETERMINING THE DIMENSIONS OF A MAILPIECE

TECHNICAL FIELD

The present invention relates to the field of mail handling and it relates more particularly to a method of determining the dimensions of a mailpiece that is to be franked in a franking system.

PRIOR ART

It is well known that determining the franking amount, i.e. the amount of postage, for a mailpiece depends on various parameters such as, in particular, the address of the recipient, the class of mail, the service requested, and the weight and the dimensions of the mailpiece. The address, class, and service can be input on the keyboard of the franking system, and the weight can be obtained using automatic scales that are internal or external to the franking system. The dimensions of the mailpiece are also often determined automatically at a feed module of the franking system.

Unfortunately, since such automatic determination is relatively costly and is therefore only justified for high franking volumes, it is unsuitable for bottom-of-range franking systems designed for performing in the range a few tens of franking operations to a few hundred franking operations per day, and in which the franking machine or "postage meter" is often fed in manual mode.

OBJECT AND DEFINITION OF THE INVENTION

An object of the present invention is thus to remedy the above-mentioned drawbacks and to enable the dimensions of a mailpiece to be determined simply. Another object of the invention is to enable such measurement to take place both for letters and for parcels.

These objects are achieved in accordance with the invention by a method of determining the dimensions of a mailpiece by means of a portable measuring device having a housing provided with an opening having a side reference surface along which said mailpiece is guided under a position sensor in a first pass along a first dimension of said mailpiece, after which pass a value for said first dimension of said mailpiece is determined by a processing unit and is communicated to a franking system to which said portable measuring device is connected, and in a second pass along a second dimension of said mailpiece, after which pass a value for said second dimension of said mailpiece is determined by said processing unit and is communicated to said franking system.

Thus, a simple portable device provided with one position sensor suffices to determine the dimensions of a parcel without using motor-driven devices. If a thickness sensor is added to it, it can also determine the dimensions of an envelope.

When the mailpiece is an envelope, during at least one of the passes of guiding said mailpiece along said side reference surface, a thickness sensor is used to measure a third dimension of said mailpiece, after which measurement a value for said third dimension of said mailpiece is determined by said processing unit and is communicated to said franking system.

Conversely, when the mailpiece is a parcel, said mailpiece is also guided along said side reference surface in a third pass along a third dimension of said mailpiece, after which pass a value for said third dimension of said mailpiece is determined by said processing unit and is communicated to said franking system.

In a particular implementation, the invention provides a method of determining the dimensions of a mailpiece by means of a portable measuring device having, mounted in a housing, a lever mounted to pivot about a hinge pin in opposition to resilient means, said lever comprising a first arm and a second arm that are interconnected via respective first ones of their ends at said hinge pin, the other end of said first arm being connected to a wheel provided with a first rotary encoder actuated by the rotation of said wheel, and the other end of said second arm being connected to a second rotary encoder actuated by the pivoting of said lever, said housing also being provided with an opening having a side reference surface for guiding said mailpiece while it is passing under said wheel, said method comprising the following steps:
  driving said wheel in rotation after the operator has guided said mailpiece in a first pass along said side reference surface, said mailpiece being passed under said wheel along a first dimension of said mailpiece;
  generating pulses at said first rotary encoder, corresponding to said first dimension of said mailpiece;
  using a processing unit to determine a value for said first dimension of said mailpiece, and communicating said value to a franking system to which said portable device is connected;
  driving said wheel in rotation after the operator has guided said mailpiece in a second pass along said side reference surface, said mailpiece being passed under said wheel along a second dimension of said mailpiece;
  generating pulses at said first rotary encoder, corresponding to said second dimension of said mailpiece; and
  using a processing unit to determine a value for said second dimension of said mailpiece, and communicating said value to said franking system.

When the mailpiece is a parcel, the method of the invention further comprises the following steps:
  driving said wheel in rotation after the operator has guided said mailpiece in a third pass along said side reference surface, said mailpiece being passed under said wheel along a third dimension of said mailpiece;
  generating pulses at said first rotary encoder, corresponding to said third dimension of said mailpiece; and
  using a processing unit to determine a value for said third dimension of said mailpiece, and communicating said value to said franking system.

Conversely, when the mailpiece is an envelope, the method of the invention further comprises a step of pivoting said lever to a position that is substantially constant and that corresponds to a third dimension of said mailpiece; a step of generating pulses at said second rotary encoder corresponding to said third dimension of said mailpiece; and a step of using said processing unit to determine a value for said third dimension of said mailpiece and of communicating said value to said franking system.

Preferably, said dimensional values are displayed on a user interface incorporated into at least one of the elements constituted by said franking system and by said portable measuring device.

Advantageously, said portable measuring device is connected to said franking system via a wireless link.

BRIEF DESCRIPTION OF THE DRAWINGS

Other characteristics and advantages of the invention appear from the following description of particular implementations, given by way of example, with reference to the accompanying drawings, in which.

DETAILED DESCRIPTION OF PREFERRED IMPLEMENTATIONS

The portable measuring device for implementing the method of the invention can, with its simple and entirely non-motor-driven means, either determine the length, the width, and the thickness of an envelope, provided that the thickness of said envelope does not exceed a predetermined thickness, or determine the length, the width, and the height of a parcel.

Figure 1:
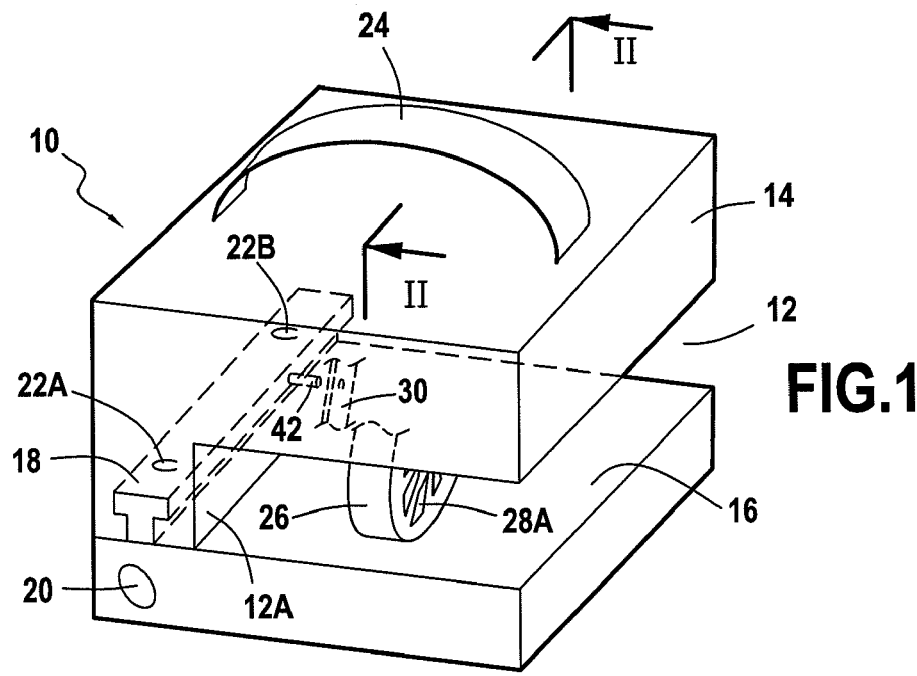
FIG. 1 is a diagrammatic view showing an embodiment of a portable measuring device making it possible to determine the dimensions of a mailpiece using the method of the invention.
Figure 2:
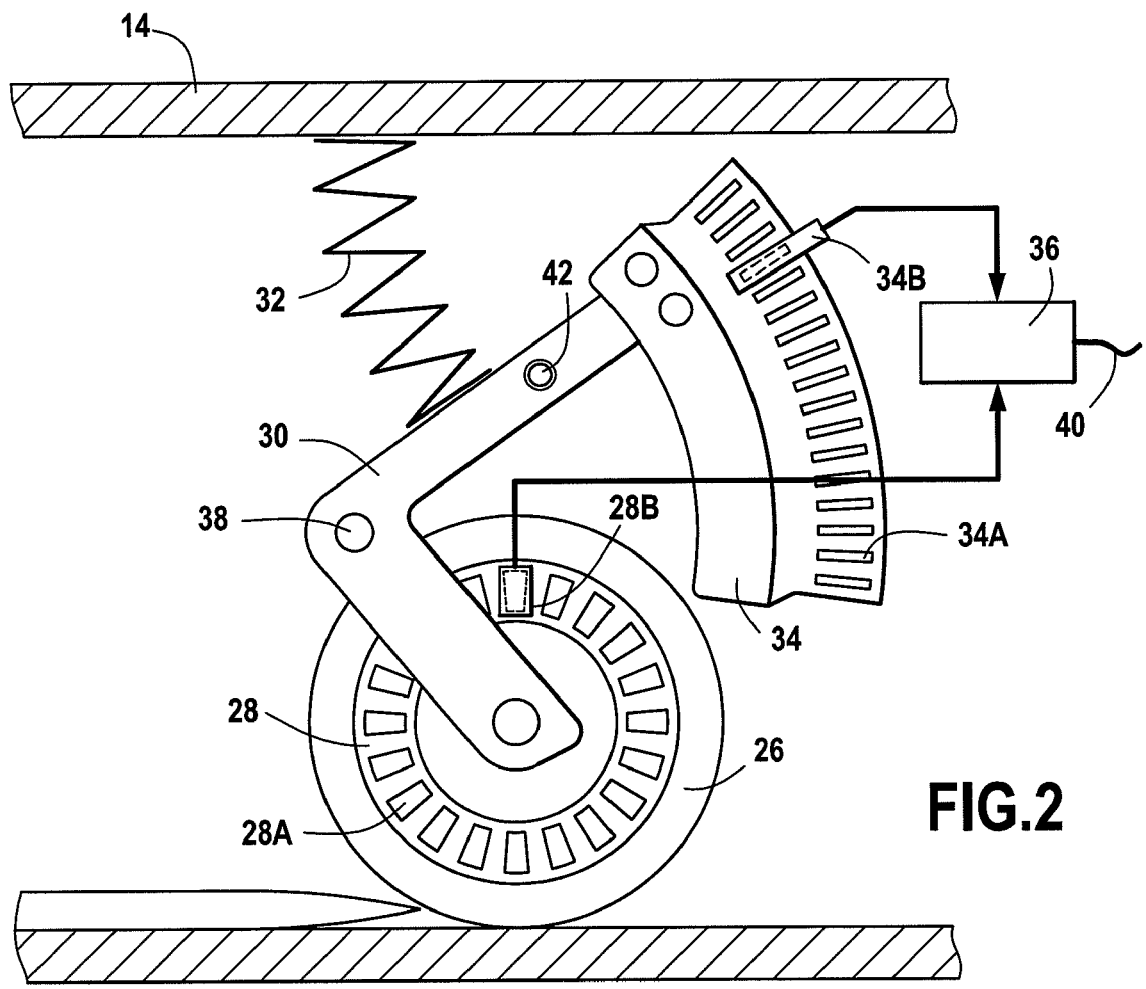
FIG. 2 is a section view on the plane II-II of FIG. 1.

FIGS. 1 and 2 show an embodiment of such a device that makes it possible to determine the dimensions of an envelope in accordance with the invention.

The device 10 is in the general shape of a rectangular block or of a cubic block, and a rectangular opening or slot 12 passes through it. The height of said opening corresponds to a maximum allowable height (typically 25 mm) for passing the envelope to be measured, and said opening is provided with a side reference surface 12A making it possible to guide the envelopes while they are passing through. The device can be placed beside the franking system but it is more advantageously mounted in fixed manner on a side wall of said system (see, for example, FIGS. 3A and 4). It is made up of two separable portions, namely a housing 14 that is Γ-shaped, and a conveyor deck 16 over which the user causes the envelope that is to be measured to move twice, once in its length direction, and another time in its width direction. The housing is removably fastened to said deck via its vertical portion, e.g. by means of a rail 18, a control button 20 actuating studs 22A, 22B passing through said rail making it possible, as is known, by the user pressing on said button, to release said housing from the deck. The housing advantageously has a carrying handle 24 for enabling it to be used on parcels.

As shown in the section view of FIG. 2, double detection means are provided in the opening 12 for the purpose of determining firstly the length and the width of the envelope and secondly the thickness thereof, while said envelope is being guided by the user along the side reference surface 12A. More particularly, a wheel 26 actuated by the movement of the envelope with which it is put into contact is provided with a first rotary encoder 28 having marking 28A that goes past a first sensor 28B, and is mounted at a free end of a pivotally mounted lever 30 that acts in opposition to resilient return means 32 secured to the housing 14. Said lever 30 that has one end connected to the wheel 28 preferably comprises two arms forming an L-shape or a V-shape, and its other end is connected to a second rotary encoder 34 having marking 34A that goes past a second sensor 34B with which it co-operates.

It should be noted that, in order to avoid jamming thin envelopes, the return force exerted on the pivotally mounted lever 30 by the resilient means 32 must be as small as possible while being sufficient to guarantee that the wheel is 26 is put in motion rapidly by the envelope.

In co-operation with a processing unit 36 connected to the accounting means of the franking system, the first sensor is suitable for delivering a value for the length or the width of the envelope, while the second sensor is suitable for delivering a value for the thickness of said envelope.

For this purpose, under the action of the wheel 26, the lever 30 pivots about a hinge pin 38 disposed, for example, at the intersection between the two arms of the L-shape or V-shape that form between them an angle advantageously lying in the range 30° to 90°. Said pin is mounted in the housing 14 transversely relative to the direction in which the envelopes move. The second rotary encoder 34 is advantageously in the form of a ring segment that extends through an angle of about 30°, and that bears the marking 34A that is itself constituted merely by slots or openings disposed in a circular arc configuration. The second sensor 34B is advantageously formed of a light emitter/receiver assembly (e.g. using light-emitting diode (LED) technology) secured to the housing 14 and that, each time a mark goes past, delivers a signal for the processing unit 36. Thus, at the processing unit, the number of openings or slots seen by the sensor is counted, and the thickness of the envelope is deduced from that counted number. Similarly, the size of the envelope (length or width) is obtained by the number of marks 28A going past the first sensor 28B (conventionally constituted by a light emitter/receiver assembly, e.g. using LED technology) between two halts of the first rotary encoder 28 while the user advances an envelop on the conveyor deck until said envelope is no longer engaged with the wheel 26. Once determined, these dimensions are transmitted via a link cable 40 to the franking system.

Figure 3A:
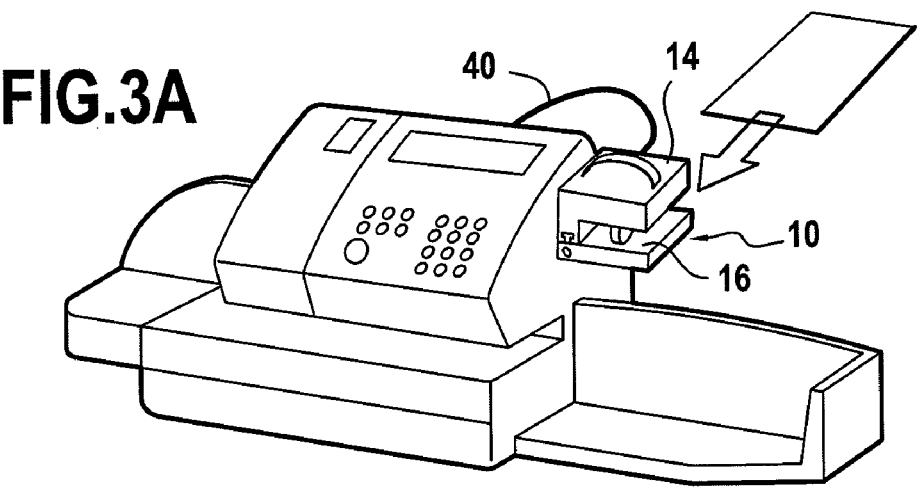
FIGS. 3A, 3B, and 3C show successive steps making it possible to determine the length, the width, and the thickness of an envelope using the portable device of FIG. 1.
Figure 3B:
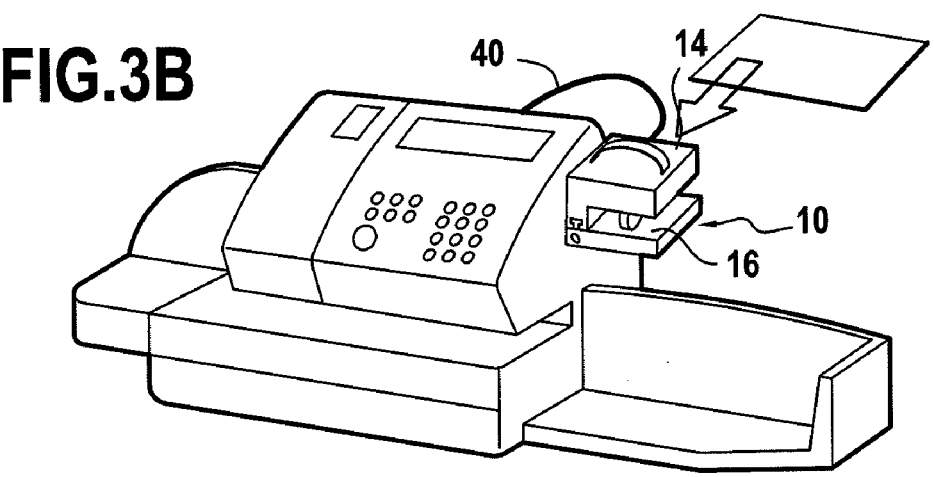
Figure 3C:
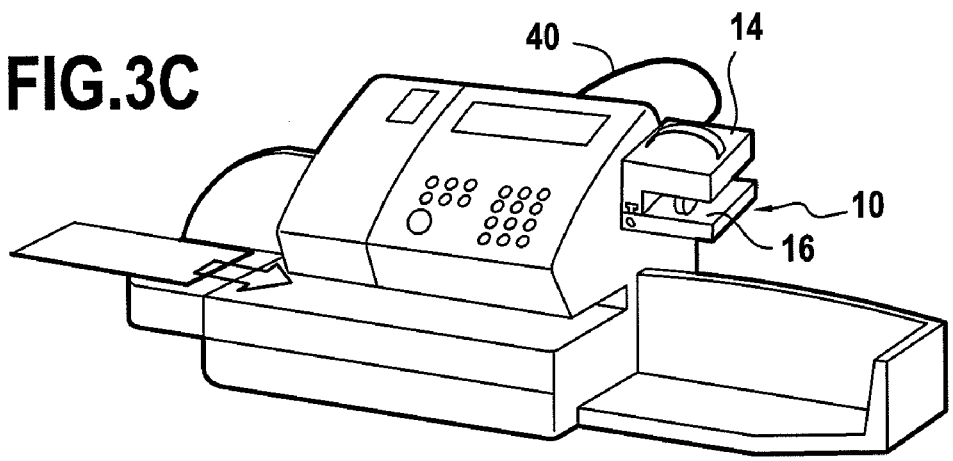

Operation of the device is described below with reference to FIGS. 3A to 3C. In the initial state, the wheel 26 that has the first rotary encoder 28 is at a halt. When the user passes the envelope through the slot 12 of the housing for the first time (in the length direction as shown in FIG. 3A), said envelop causes the wheel 26 to move in rotation at a substantially constant advance speed until it is no longer in engagement (i.e. over its entire length), and causes the lever 30 to pivot to a substantially constant position corresponding to the thickness of said envelope. These movements of the wheel and of the lever generate pulses at the first and second sensors, corresponding respectively to the length and to the thickness of the envelope, the values of which length and thickness are then determined by the processing unit 36 before being sent to the franking system. Once it has received said values, the franking system, via its user interface, optionally displays them and invites the user to pass the envelope through the device again, this time in its width direction (see FIG. 3B) in order to obtain a measurement of this other dimension of the envelope. Naturally, this new pass is also accompanied by a new measurement of the thickness that can either be taken into account by the processing unit (in which case, a mean value can be computed) or else ignored by said processing unit. As above, once the value for the width has been determined by the processing unit, it is sent to the franking system for, if necessary, display and validation by the user who is then authorized, via the user interface, to proceed with the franking of the envelope (FIG. 3C).

It should be noted that, in order for the measurements of the length and of the width to be relatively precise, it is necessary for the wheel to turn only while it is in engagement with the envelope, and this presupposes that the wheel is not mounted free on its pin, but rather than it is snug-fitting thereon.

Figure 4:
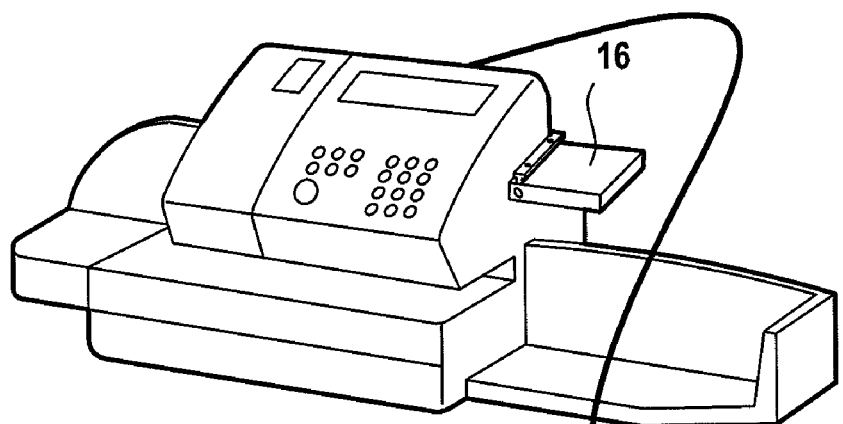
FIG. 4 shows the step making it possible to determine the length, the width, and the height of a parcel using the portable measuring device of FIG. 1.

FIG. 4 shows the use of the portable measuring device for measuring the dimensions of a parcel or packet. In this configuration, the housing 14 is separated from the conveyor deck 16 and is then connected to the franking system only via its link cable 40. This separation, achieved by acting on the control button 20, is indicated automatically to the processing unit 26 which then informs the franking system via the link 40, and said separation causes the pivotally mounted lever 30 to be locked in a predetermined position by acting on a stud 42 that then extends from the housing 14 and passes through said lever. The user can then move the housing successively over the three faces of the parcel so as to acquire the three dimensions that are then, as above, forwarded to the franking system by the processing unit 36. Between each input, the dimensional value determined by the first rotary encoder 28 is displayed on the user interface of the franking system, and, once all three values have been determined, the user is authorized to frank a label that is then stuck to the parcel.

It should be noted that although the portable measuring device is described as being connected to the franking system via a link 40 that is of the wired type, it is also possible for said link to be of the wireless type, e.g. of the WiFi type. It is also possible for said link to be omitted and for the device then to have a display (not shown) connected directly to the processing unit 36 and on which the various dimensions of the mailpiece as measured by the rotary encoders 28, 34 can appear, those values then being input manually by the user on the user interface of the franking system.

It should also be noted that although the portable measuring device is described with reference to rotary encoders, any other type of sensor can naturally be envisaged.

Figure 5:
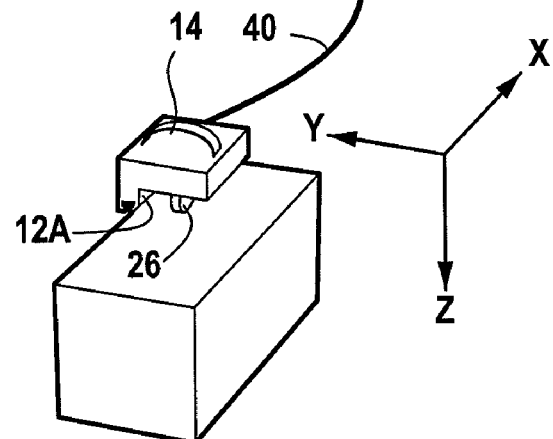
FIG. 5 is a diagrammatic view of a second embodiment of a portable measuring device.
Figure 5:
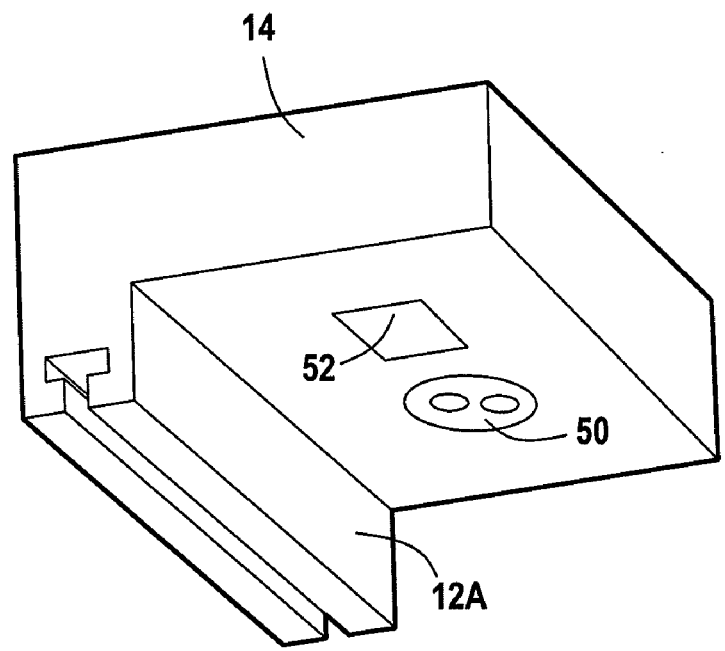

FIG. 5 is a perspective view from below of such a portable measuring device that has an optical position encoder 50, which encoder is disposed in the housing 14 above the guide path of the mailpiece and can advantageously replace the assembly comprising the wheel and the first rotary encoder. The portable measuring device also has a thickness sensor 52 that can also advantageously replace the assembly comprising the lever and the second rotary encoder so that the method of the invention consists in guiding the mailpiece along a side reference surface under said position sensor in a first pass along a first dimension of said mailpiece, after which pass a value for the first dimension of the mailpiece is determined by the processing unit to which the position sensor is connected and is communicated to a franking system to which the portable measuring device is connected, and in a second pass along a second dimension of the mailpiece, after which pass a value for the second dimension of the mailpiece is determined by the processing unit and is also communicated to the franking system.

Then, if the mailpiece is an envelope, then, during at least one of the passes of guiding the mailpiece along the side reference surface, the thickness sensor is used to measure a third dimension of the mailpiece, after which measuring step, a value for the third dimension of the mailpiece is determined by the processing unit to which the thickness sensor is connected, and that value is communicated to the franking system.

Conversely, if the mailpiece is a parcel, the mailpiece is then guided along the side reference surface in a third pass along a third dimension of the mailpiece, after which pass a value for the third dimension of the mailpiece is determined by the processing unit and is communicated to the franking system.

What is claimed is:

1. A method of determining the dimensions of a mailpiece using a portable measuring device having a housing provided with an opening, said opening having a side reference surface, the method comprising:

guiding a first dimension of said mailpiece along said side reference surface and under a position sensor in a first pass, determining, via a processing unit, a value for said first dimension of said mailpiece obtained during said first pass, communicating said value of said first dimension to a franking system connected to said portable measuring device, guiding a second dimension of said mailpiece along said side reference surface and under said position sensor in a second pass, determining, via said processing unit, a value for said second dimension of said mailpiece obtained during said second pass, communicating said value of said second dimension to said franking system.

2. A method according to claim 1, wherein, during at least one of the said first and second passes of guiding said mailpiece along said side reference surface, a thickness sensor is used to measure a third dimension of said mailpiece, after which measurement a value for said third dimension of said mailpiece is determined by said processing unit and is communicated to said franking system.

3. A method according to claim 1, further comprising guiding a third dimension of said mailpiece along said side reference surface in a third pass, determining a value for said third dimension of said mailpiece by said processing unit and communicating said value of said third dimension to said franking system.

4. A method of determining the dimensions of a mailpiece using a portable measuring device having, mounted in a housing, a lever mounted to pivot about a hinge pin in opposition to resilient means, said lever comprising a first arm and a second arm that are interconnected via respective first ones of their ends at said hinge pin, the other end of said first arm being connected to a wheel provided with a first rotary encoder actuated by the rotation of said wheel, and the other end of said second arm being connected to a second rotary encoder actuated by the pivoting of said lever, said housing also being provided with an opening having a side reference surface for guiding said mailpiece while it is passing under said wheel, said method comprising the following steps:

driving said wheel in rotation while a first dimension of said mailpiece is guided in a first pass along said side reference surface, said mailpiece being passed under said wheel;

generating pulses at said first rotary encoder, corresponding to said first dimension of said mailpiece;

determining a value for said first dimension of said mailpiece by a processing unit, and communicating said value of said first dimension to a franking system connected to said portable device;

driving said wheel in rotation while a second dimension of said mailpiece is guided in a second pass along said side reference surface, said mailpiece being passed under said wheel;

generating pulses at said first rotary encoder, corresponding to said second dimension of said mailpiece; and determining a value for said second dimension of said mailpiece by said processing unit, and communicating said value of said second dimension to said franking system.

5. A method according to claim 4, further comprising the following steps:

driving said wheel in rotation while a third dimension of said mailpiece is guided in a third pass along said side reference surface, said mailpiece being passed under said wheel;

generating pulses at said first rotary encoder, corresponding to said third dimension of said mailpiece; and determining a value for said third dimension of said mailpiece by said processing unit, and communicating said value of said third dimension to said franking system.

6. A method according to claim 5, wherein said first, second, and third dimensions of said mailpiece correspond to the length, the width, and the height of a parcel.

7. A method according to claim 4, further comprising a step of pivoting said lever to a position that is substantially constant and that corresponds to a third dimension of said mailpiece; a step of generating pulses at said second rotary encoder corresponding to said third dimension of said mailpiece; and a step of determining a value for said third dimension of said mailpiece by said processing unit and communicating said value of said third dimension to said franking system.

8. A method according to claim 7, wherein said first, second, and third dimensions of said mailpiece correspond to the length, the width, and the thickness of an envelope.

9. A method according to claim 1, wherein said dimensional values are displayed on a user interface incorporated into at least one of the elements constituted by said franking system and by said portable measuring device.

10. A method according to claim 1, wherein said portable measuring device is connected to said franking system via a wireless link.

11. A franking system comprising:
a franking device for franking a mailpiece; and
a portable measuring device that determines the dimensions of the mailpiece, the portable measuring device being detachably connected to the franking device,
  wherein the portable measuring device includes a housing provided with an opening, said opening having a side reference surface and a position sensor,
  wherein a first dimension of the mailpiece is guided along the side reference surface and under the position sensor in a first pass to determine a value for the first dimension and a second dimension of the mailpiece is guided along the side reference surface and under the position sensor in a second pass to determine a value for the second dimension,
the portable measuring device further comprising a communication device that communicates the value of the first dimension and the value of the second dimension to the franking device.

12. The franking system according to claim 11, wherein, during at least one of the first and second passes of guiding the mailpiece along the side reference surface, a thickness sensor is used to measure a third dimension of the mailpiece, after which measurement a value for the third dimension of the mailpiece is determined and is communicated to the franking device.

13. The franking system according to claim 11, wherein a third dimension of the mailpiece is also guided along the side reference surface and under the position sensor in a third pass to determine a value for the third dimension and the value for the third dimension is communicated to the franking device.

* * * * *